(12) United States Patent
Kadlabalu et al.

(10) Patent No.: US 12,001,389 B2
(45) Date of Patent: *Jun. 4, 2024

(54) SYSTEM AND METHOD FOR PROVIDING CORRELATED CONTENT ORGANIZATION IN AN ENTERPRISE CONTENT MANAGEMENT SYSTEM BASED ON A TRAINING SET

(71) Applicant: ORACLE INTERNATIONAL CORPORATION, Redwood Shores, CA (US)

(72) Inventors: Hareesh S Kadlabalu, Plainview, NY (US); Bhageerath Arasachetty, Bangalore (IN); Praveen Kumar Jayaram, Bangalore (IN); Shyam Babu Prasad, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,172

(22) Filed: May 10, 2022

(65) Prior Publication Data

US 2022/0269648 A1    Aug. 25, 2022

Related U.S. Application Data

(63) Continuation of application No. 16/746,326, filed on Jan. 17, 2020, now Pat. No. 11,372,809, which is a
(Continued)

(51) Int. Cl.
*G06F 16/14* (2019.01)
*G06F 7/14* (2006.01)
(Continued)

(52) U.S. Cl.
CPC .............. *G06F 16/122* (2019.01); *G06F 7/14* (2013.01); *G06F 16/148* (2019.01);
(Continued)

(58) Field of Classification Search
CPC .... G06F 16/122; G06F 16/148; G06F 16/168; G06F 7/14
See application file for complete search history.

(56) References Cited

U.S. PATENT DOCUMENTS 7,076,494 B1    7/2006   Baer
7,346,844 B1    3/2008   Baer
(Continued)

*Primary Examiner* — Eliyah S. Harper
(74) *Attorney, Agent, or Firm* — TUCKER ELLIS LLP

(57) ABSTRACT

Described herein are systems and methods for providing a correlated content organization in a content management system based upon a training set. In accordance with an embodiment, the systems and methods described herein can build a training set based upon observations of received inputs to determine patterns that are used often in content merges. Once a pattern is established, the systems and methods can provide indications of proposed merges based upon the training set and rules established therefrom that fit the same, or similar (e.g., within a defined variant) of the pattern. The system can then receive an indication of whether the suggestion is accepted or rejected, and such decision can be fed back into the learning system. This way the accuracy of the content merge improves over time.

20 Claims, 13 Drawing Sheets

Related U.S. Application Data continuation-in-part of application No. 16/586,380, filed on Sep. 27, 2019, now Pat. No. 11,334,534.

(51) Int. Cl.
*G06F 16/11* (2019.01)
*G06F 16/16* (2019.01)
*G06N 5/04* (2023.01)
*G06N 20/00* (2019.01)

(52) U.S. Cl.
CPC ............ *G06F 16/168* (2019.01); *G06N 5/04* (2013.01); *G06N 20/00* (2019.01)

(56) References Cited

U.S. PATENT DOCUMENTS

| | | | |
|---|---|---|---|
| 7,401,097 B1 | 7/2008 | Baer | |
| 7,660,902 B2 | 2/2010 | Graham | |
| 2006/0053157 A1 | 3/2006 | Pitts | |
| 2007/0003914 A1 | 1/2007 | Yang | |
| 2008/0233930 A1 | 9/2008 | Wurster | |
| 2009/0077141 A1 | 3/2009 | Hady | |
| 2009/0157667 A1* | 6/2009 | Brougher | G06F 16/25 707/999.005 |
| 2009/0163459 A1 | 6/2009 | Trauner | |
| 2009/0178144 A1* | 7/2009 | Redlich | G06F 21/6209 726/27 |
| 2010/0036840 A1 | 2/2010 | Pitts | |
| 2011/0078190 A1* | 3/2011 | Samuel | G06Q 50/01 707/E17.001 |
| 2012/0203708 A1 | 8/2012 | Psota | |
| 2012/0225455 A1 | 9/2012 | Fukuhara | |
| 2013/0054667 A1 | 2/2013 | Mahajan | |
| 2013/0159251 A1 | 6/2013 | Skrenta | |
| 2013/0325916 A1 | 12/2013 | Pitts | |
| 2013/0332429 A1 | 12/2013 | Arasachetty | |
| 2014/0282192 A1* | 9/2014 | Grossman | G06F 16/285 715/771 |
| 2015/0100356 A1* | 4/2015 | Bessler | G06Q 10/0631 705/7.12 |
| 2017/0147931 A1* | 5/2017 | Desai | H04L 41/0893 |
| 2017/0357551 A1 | 12/2017 | Zacks | |
| 2018/0101599 A1* | 4/2018 | Arnold | G06F 40/274 |
| 2018/0189734 A1* | 7/2018 | Newhouse | G06F 16/25 |
| 2018/0336222 A1 | 11/2018 | Bourgeois | |
| 2018/0336509 A1* | 11/2018 | Guttmann | G06F 21/6218 |
| 2018/0353108 A1* | 12/2018 | Prate | G06F 9/453 |
| 2019/0045002 A1 | 2/2019 | Arasachetty | |
| 2019/0102390 A1 | 4/2019 | Antunes | |
| 2019/0108225 A1 | 4/2019 | Jayaram | |
| 2019/0163459 A1 | 5/2019 | Sreenivasa | |
| 2019/0163469 A1 | 5/2019 | Sreenivasa | |
| 2019/0220550 A1 | 7/2019 | Arasachetty | |
| 2019/0325062 A1* | 10/2019 | Rogulenko | G06F 16/2343 |
| 2020/0004853 A1 | 1/2020 | Prasad | |
| 2020/0183607 A1 | 6/2020 | Prasad | |
| 2020/0356528 A1 | 11/2020 | Prasad | |
| 2021/0097031 A1 | 4/2021 | Kadlabalu | |

\* cited by examiner

| | prop1 | prop2 | prop3 | prop4 | prop5 | prop6 | prop7 | prop8 |
|---|---|---|---|---|---|---|---|---|
| Doc1 (1210) | A | B | K1 | M1 | C | | D | |
| Doc2 (1214) | A12 | B12 | K2 | M2 | C12 | | | E12 |
| Doc3 (1216) | A13 | B13 | K3 | M3 | C13 | | | E13 |
| Doc4 | A14 | B14 | K4 | M4 | C14 | | | |
| Doc5 | A15 | B15 | K5 | M5 | C15 | | | |
| Doc6 (1212) | A | B | K14 | M6 | C | | D | E |
| Doc7 (1215) | A12 | B12 | K15 | M7 | C12 | | | E12 |
| Doc8 (1217) | A13 | B13 | K17 | M8 | C12 | | | E13 |
| Doc9 | A14 | B14 | K18 | M9 | C14 | | | |
| Doc10 (1213) | A | B | K19 | M10 | C | | | E |
| Doc11 | A23 | B23 | K6 | M11 | C23 | | | |
| Doc12 | A24 | B24 | K7 | M12 | C24 | | | |

*FIGURE 12*

SYSTEM AND METHOD FOR PROVIDING CORRELATED CONTENT ORGANIZATION IN AN ENTERPRISE CONTENT MANAGEMENT SYSTEM BASED ON A TRAINING SET

CLAIM OF PRIORITY

This application is a continuation of U.S. patent application titled "SYSTEM AND METHOD FOR PROVIDING CORRELATED CONTENT ORGANIZATION IN AN ENTERPRISE CONTENT MANAGEMENT SYSTEM BASED ON A TRAINING SET", application Ser. No. 16/746,326, filed Jan. 17, 2020; which application is a continuation in part of, and claims the benefit of priority to, U.S. patent application titled "SYSTEM AND METHOD FOR PROVIDING A CORRELATED CONTENT ORGANIZING TECHNIQUE IN AN ENTERPRISE CONTENT MANAGEMENT SYSTEM", application Ser. No. 16/586,380, filed Sep. 27, 2019; both of which above applications and the contents thereof are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing a correlated content organizing technique in a content management system, such as an Enterprise Content Management (ECM) system.

BACKGROUND

In general, content management systems (variously through this specification, the terms "content management system", "enterprise content management system", "ECM", "ECM system", and "ECM application" are used interchangeably) consists of a repository to store content items. The number of content items grows with the age of the system. One of the more frequently performed operations by users is to find the existing content items in an ECM system. The execution of such search operations becomes more and more complicated and time consuming as the number of content items grow.

However, in general, there are no mechanisms in ECM to merge multiple correlated content items into a single content item or even to automatically organize correlated content items into virtual structures (e.g., folios based on smart metadata tagging). Because of this, the searches performed on such systems generally need to search for each individual content item before referencing them, which is time and resource intensive.

SUMMARY

Described herein are systems and methods for providing a correlated content organizing technique in a content management system.

In accordance with an embodiment, the systems and methods discussed herein provide the ability to dynamically merge multiple correlated (where dependency is derived from each content item's metadata set) content items into one single content item/document and/or organize them into a single folio for ease of future access. For example, when a user performs check-in of a new content item into an ECM application, a smart content organizer agent can find correlated and/or dependent content items and attempt to merge both content items into one single content item. This can enable all the correlated content items to exist as one single document/item in an ECM application, with the benefit of providing increased ease of accessing correlated and/or dependent content item(s) in a shorter amount time.

In accordance with an embodiment, the ECM system can also be configured to organize the correlated and/or dependent content items into one or more folios to enable the correlated content items to exist within one single virtual structure in an ECM application, with the result of improving the ease of access to correlated and/or dependent content item(s) in a shorter amount of time.

In accordance with an embodiment, in addition to providing capabilities for newly created and growing ECM systems, the systems and methods provided herein also can be used in existing ECM systems. In such systems, there can be millions (or more) of content items already uploaded. The systems and methods described herein can provide for a content merge detection operation and merge correlated and/or dependent content items into a smaller amount of items/documents (e.g., one file or document). Additionally, the systems and methods can optionally provide for an agent to organize all correlated and/or dependent content items into a single folio structure.

In accordance with an embodiment, an exemplary for providing correlated content organization in a content management system based on a training set can provide, at a computer, the computer including a microprocessor, an application server comprising a content management system, a database associated with the application server, and a user interface. The method can provide, at the content management system, a file merge suggestion engine, the file merge suggestion engine being associated with a storage comprising a training set, the training set comprising a plurality of metadata values. The method can configure, by the file merge suggestion engine, a merge suggestion rule, the configuring being based upon a plurality of prior file merges recorded in the training set. The method can receive, at the content management system, a file, the file having a set of metadata values. The method can provide a suggestion to merge the received file with one or more existing files at the database, the suggestion being based upon the configured merge suggestion rule. The method can receive, at the content management system, a response to the suggestion to merge the received file with one or more existing files at the database. The method can update a confidence score associated with the merge suggestion rule based upon the received response.

BRIEF DESCRIPTION OF THE FIGURES

FIG. 12 shows a training set, in accordance with an embodiment.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

In accordance with an embodiment, content management systems enable content to be created, uploaded, accessed, and modified by a plurality of users. For example, a content item such as a document can be created and uploaded by one user, and subsequently accessed and modified by other users. Additionally, a single document can be accessed (e.g., viewed) concurrently by multiple users. Content management systems can be useful for enterprises in which, for example, several individuals collaborate on a project by accessing the same document or set of documents.

Figure 1:
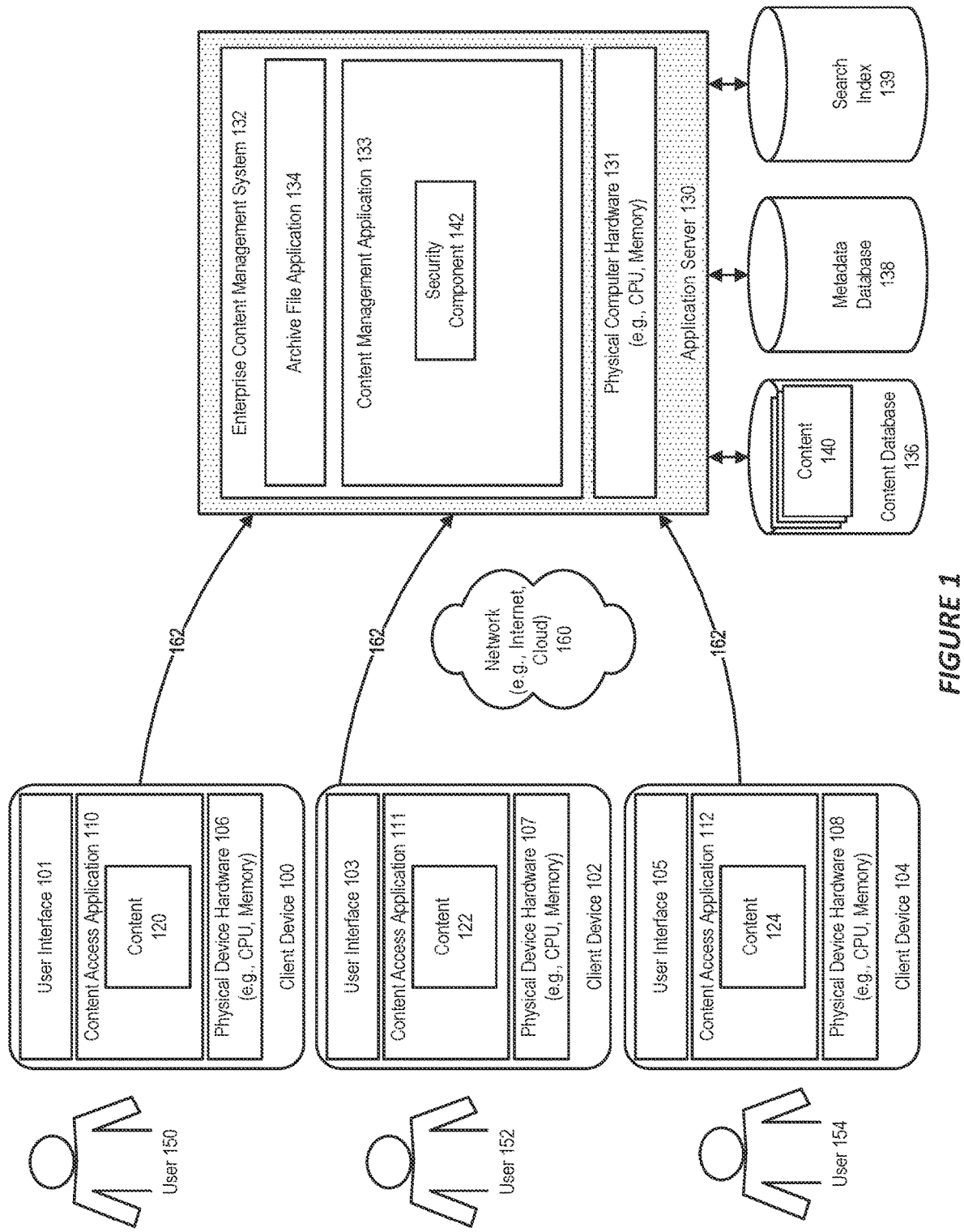
FIG. 1 illustrates a system for providing a correlated content organizing technique in a content management system, in accordance with an embodiment.

FIG. 1 illustrates a system for providing a correlated content organizing technique in a content management system, in accordance with an embodiment.

As illustrated in FIG. 1, in accordance with an embodiment, for each of a plurality of client devices 100, 102, and 104 having a user interface 101, 103, 105 and physical device hardware 106, 107, 108 (e.g., CPU, memory), the client device can be provided with a content access application 110, 111, 112 for execution thereon.

In accordance with an embodiment, the client device can communicate 162 with an application server 130 that includes a physical computer hardware 131 (e.g. CPU, memory) and an enterprise content management system 132.

In accordance with an embodiment, the content access application at the client device can communicate with the enterprise content management system via a network 160 (e.g., the Internet, or a cloud environment). The content access application can be configured to enable a user 150, 152, 154 to view, upload, modify, delete, or otherwise access content such as content items 120, 122, 124 at each client device. For example, new content can be added or uploaded to the enterprise content management system by a user interacting with the content access application on an associated client device. The content can be transmitted to the enterprise content management system for storage.

In accordance with an embodiment, the enterprise content management system can be or include a platform for consolidating content that can be managed by a plurality of users of an enterprise. In accordance with an embodiment, the enterprise content management system can be configured to communicate with a content database 136 for storing content (or content items) 140, and can deliver the content to users via their client devices. In accordance with an embodiment, the content database can be a relational database management system (RDBMS), file system, or other data source which the enterprise content management system can access. Content can include, for example, documents, files, e-mails, memos, images, videos, slide presentations, conversations, and user profiles.

In accordance with an embodiment, the enterprise content management system can be configured to associate metadata with the content. Metadata can include information about an item of content, such as its title, author, release date, historical data such as who has accessed the item and when, a location where the content is stored, and the like.

In accordance with an embodiment, the metadata can be stored in a metadata database 138. In accordance with an embodiment, the enterprise content management system can be configured to communicate with the metadata database to access metadata stored therein, and to store metadata generated by the system in the metadata database.

In accordance with an embodiment, the enterprise content management system can also be configured to communicate with a search index 139. The search index can be configured to provide indexing and searching of content and data stored in the content database and the metadata database. In accordance with an embodiment, the search index can be a relational database management system (RDBMS) or a search tool such as Oracle Secure Enterprise Search (Oracle SES).

In accordance with an embodiment, content stored within the content database can be checked out for modification by a user at the user's client device, and checked back in to the enterprise content management system.

In accordance with an embodiment, a checked out document can be locked while checked out to a particular user, to prevent other users from modifying the checked out document. However, the system can be configured to permit viewing of the document by other users while it is checked out. In accordance with an embodiment, new versions of content can be created and stored in the content database of the enterprise content management system.

In accordance with an embodiment, the enterprise content management system can further include a content management application 133 including a security component 142. The security component can include or store a security data including user permissions and privileges with respect to particular items of content and/or particular actions. For example, the security data can indicate that certain users are permitted to access and/or modify certain documents. As another example, the security data can indicate that only certain users are permitted to create links between content items, to modify certain content items, or to delete content items.

Providing a Correlated Content Organizing Technique

Figure 2:
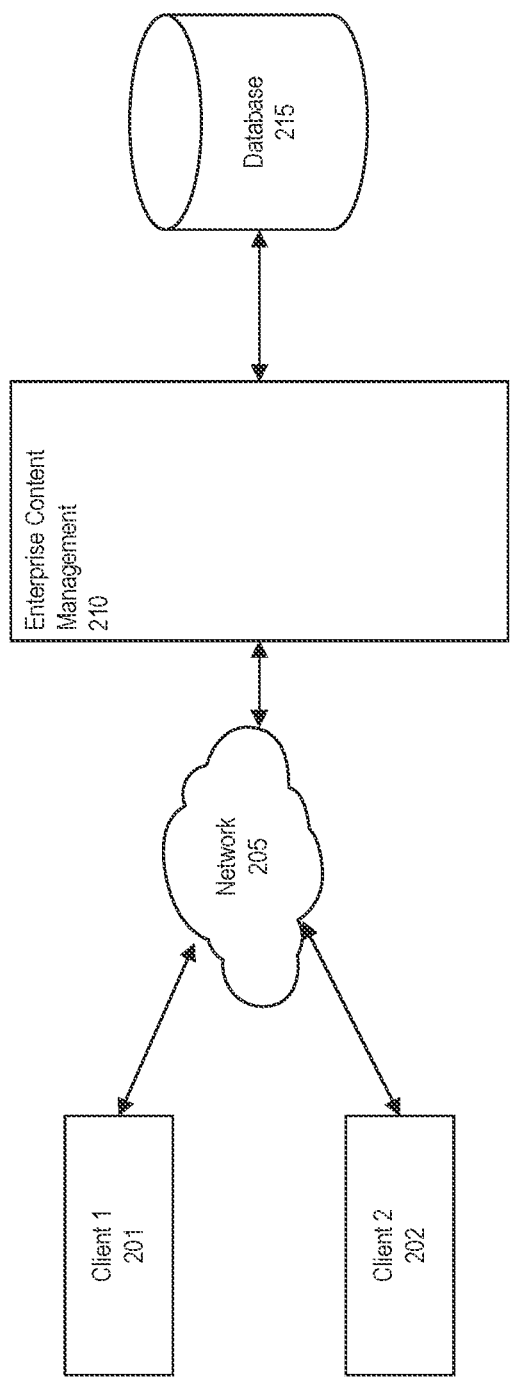
FIG. 2 illustrates a system for providing a correlated content organizing technique in a content management system, in accordance with an embodiment.

FIG. 2 illustrates a system for providing a correlated content organizing technique in a content management system, in accordance with an embodiment.

In accordance with an embodiment, in general, ECM systems 210 comprise a repository (e.g., database 215) to store content items. Such content items can be viewed, accessed, modified, updated, checked out or checked in depending upon a request received from a client (e.g., client 1 201 or client 2 202), via a network 205. The number of content items generally grows with the age of the ECM. A frequently performed operations by users is to search existing content to find desired/queried items in an ECM system and the execution of search operation becomes more and more complicated and time consuming as the number of content items grow.

In accordance with an embodiment, ECMs system having very large numbers of content items generally have performance impact during search operations. The systems and methods described herein can improve such performance by reducing the number of content items in the ECM system by merging content. This can improve search performance as searching will be on smaller datasets. In addition, searches can be performed on folios rather than on/for multiple content items.

In accordance with an embodiment, the presently disclosed systems and methods provide a mechanism for users of an ECM to: a) perform merge of checked-in content item with the available correlated and/or dependent content item in the ECM application, based on configured metadata rules; b) perform grouping of correlated and/or dependent content items into virtual structure within the ECM system (e.g., folios); and c) run content merge detection operations and list out the possible merge-able content items and perform merge operation upon receipt of request, or automatically, or via scheduled job.

Automatic Merge of Uploaded Content

In accordance with an embodiment, each content item in an ECM system/application can have be associated with uniquely identifiable metadata. There can be more than one content item in an ECM application which could be providing information/case study on a particular subject. As the number of content items grow, the time taken to find all the relevant content items pertaining to a subject of interest becomes a time consuming task and on most occasions it would be more meaningful to reference/present these content items as one single content item in an ECM application.

In accordance with an embodiment, as an example, consider a medical report of a patient maintained by a hospital. The patient's record could contain information regarding visits to multiple laboratories to get different kinds of medical examinations done pre-surgery, or even in emergency. A surgeon who is about to perform surgery on such a patient would benefit from being able to refer all the laboratory reports of the patient to study the condition prior to performing the surgery. And on most occasions the decisions must be made in a very short span of time. During such circumstances, even though the laboratory reports are made available online, it would be a tedious and problematic task for the surgeon to search for each of the reports from different laboratories, download and refer them in a quick span of time.

In accordance with an embodiment, the systems and methods described herein can identify the content items (laboratory reports) being newly uploaded to the ECM application belonging to particular subject (patient) and perform auto-merge of such content items (multiple laboratory reports) into one single content item (laboratory report) based upon tagged metadata. This can then allow the user (surgeon) to look for a single content item and, optionally, download the same for reference, thus making the job of finding the content item (which is a collection of all the co-related information on a subject) very easy and faster than if the files were separate. The systems and methods can merge only the co-related content items (laboratory reports) into one single content item, while not merging/mixing other content items corresponding to the same subject, like laboratory bills with the reports. This can be controlled by a smart metadata tagging within ECM application.

In accordance with an embodiment, the systems and methods described herein can additionally provide a mechanism by which it can be specified how new content items should be merged to an already existing content item in the ECM application. This can then allow for greater control. For example, the systems and methods can allow for control over whether a new content item should appear in first page, or if it should be appended to the end of the existing content item, or to allow the ability to specify a page number on which the new content item should appear within the pre-existing content item.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Figure 3:
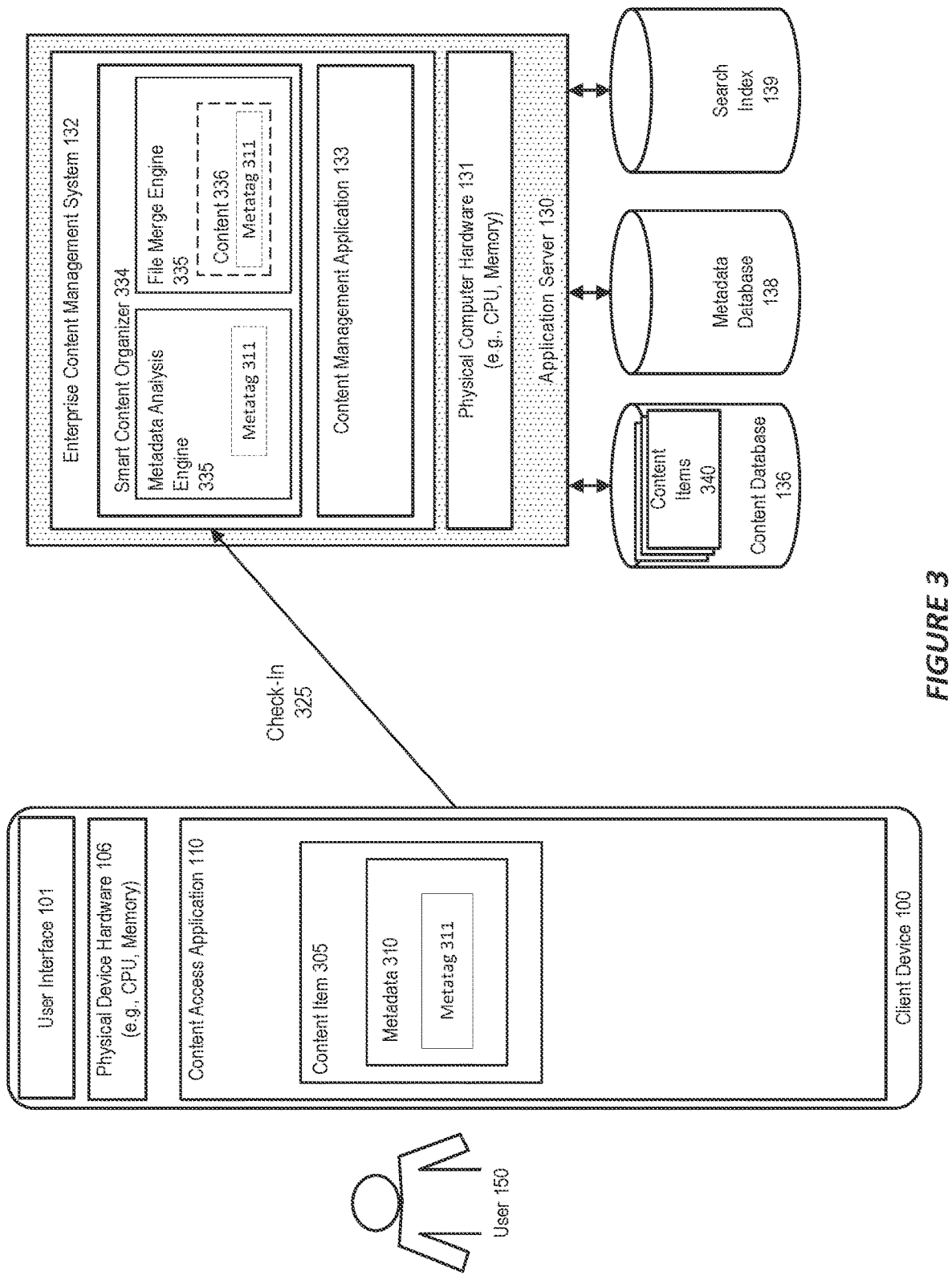
FIG. 3 illustrates a system for providing a correlated content organizing technique in a content management system, in accordance with an embodiment.

FIG. 3 illustrates a system for providing a correlated content organizing technique in a content management system, in accordance with an embodiment.

More specifically, FIG. 3 shows a system for the automatic merging of content items within a content management system. As illustrated in FIG. 3, in accordance with an embodiment, for a client device 100, having a user interface 101, and physical device hardware 106, (e.g., CPU, memory), the client device can be provided with a content access application 110 for execution thereon.

In accordance with an embodiment, the client device can be in communication with an application server 130 that includes a physical computer hardware 131 (e.g. CPU, memory) and an enterprise content management system 132, which can include a content management application 133 and a smart content organizer 334.

In accordance with an embodiment, the content access application at the client device can communicate with the enterprise content management system via a network. The content access application can be configured to enable a user 150 to view, upload, modify, delete, or otherwise access content such as data/files from the client device. For example, new content can be added or uploaded to the enterprise content management system by a user interacting with the content access application on an associated client device. The content can be transmitted to the enterprise content management system for storage.

In accordance with an embodiment, the enterprise content management system can be or can include a platform for consolidating content that can be managed by a plurality of users of an enterprise. In accordance with an embodiment, the enterprise content management system can be configured to communicate with a content database 136 for storing content (or content items), and can deliver the content to users via their client devices. In accordance with an embodiment, the content database can be a relational database management system (RDBMS), file system, or other data source which the enterprise content management system can access. Content can include, for example, documents, files, e-mails, memos, images, videos, slide presentations, conversations, and user profiles.

In accordance with an embodiment, the enterprise content management system can be configured to associate metadata 311 with the content. Metadata can include information about an item of content, such as its title, author, release date, historical data such as who has accessed the item and when, a location where the content is stored, hierarchical structure of data, and the like.

In accordance with an embodiment, the metadata can be stored in a metadata database 138. In accordance with an embodiment, the enterprise content management system can be configured to communicate with the metadata database to access metadata stored therein, and to store metadata generated by the system in the metadata database.

In accordance with an embodiment a typical enterprise content management system can frequently perform check in 325 operations. In general, when a user executes an operation to a content item, such as content item 305, the user so signals such operation via a content access application 110.

In accordance with an embodiment, the systems and methods provided herein enable the ECM to automatically, via the smart content organizer 334, find related content items, e.g., within content items 340 in content database, by performing a metadata analysis via a metadata analysis engine 335 (e.g., search within the metadata database). Upon finding suitable existing content within the content database, the smart content organizer 334 can, via the file merge engine 335, merge the uploaded content item 305 with existing content items, such as content 336, which is pulled, or accessed, from the content database 136. Such merging can be in the form of appending one document to another, or in the form of creating or adding to a folio of existing content items.

In accordance with an embodiment, a comparison of metadata can be used by the smart content organizer in determining whether to merge two files via a merge operation (and such metadata can then additionally be used to determine an order in which the merged files should appear), or to gather the files into a digital folio that can then be stored at a content database.

In accordance with an embodiment, and as an illustrative example, suppose the content item 305 to be checked into the ECM system 132 comprises an electrocardiogram (EKG) of a patient identified. The patient, for example, can be associated with a metadata tag 311. This tag could include such information as the patient's name, address, phone number, medical record number, identification, primary physician . . . etc.

In accordance with an embodiment, content 336 can comprise the patient's medical record, which can be identified by metadata tag 311, which can comprise at least a portion of the patient's information as well. By comparing the metadata, and finding enough to make a match, the smart content organizer can merge the content item 305 with the existing content 336 to form either an appended document or content item, or a folio of content items.

Figure 4:
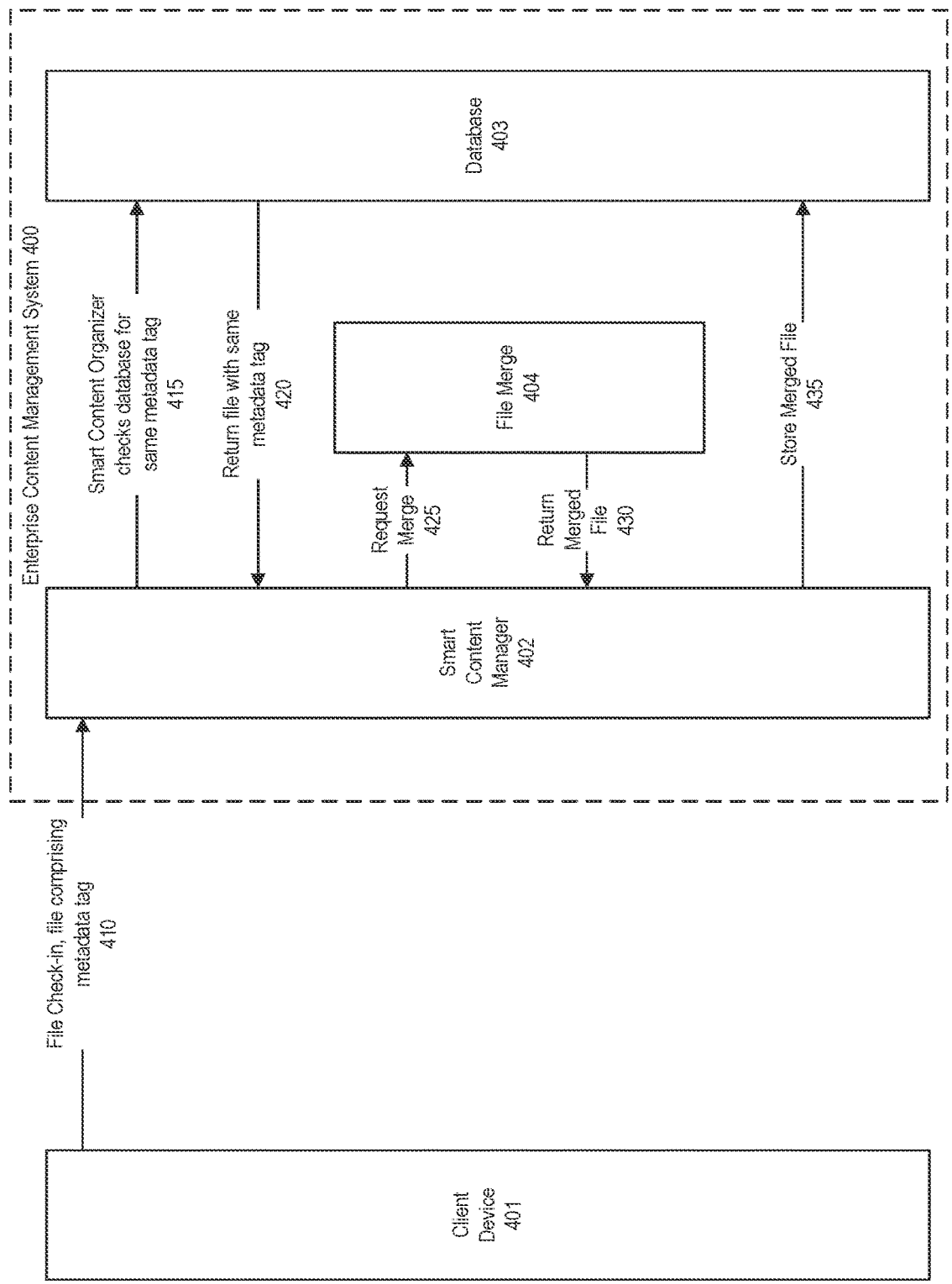
FIG. 4 illustrates a system for providing a correlated content organizing technique in a content management system, in accordance with an embodiment.

FIG. 4 is a flow chart of a method for file check in and merging in a merged file, in accordance with an embodiment.

In accordance with an embodiment, a request to check in a file 410 can be received from a client device 401 at an enterprise content management system 400. The file can be associated with a metadata tag.

In accordance with an embodiment, a smart content manager 402 can receive the file to be checked in, analyze the metadata tag associated with the checked-in file, and perform a search 415 in a database 403 to check for existing content items that match all, or at least a portion of the metadata tag of the checked in file.

In accordance with an embodiment, upon finding a file within the database 403 that matches all or at least a portion of the metadata tag, the matching file can be returned 420 to the smart content manager.

In accordance with an embodiment, the smart content manager 402 can request that the checked-in file as well as the file pulled from the database be merged 425, at a file merge 404. The file merge can, in some embodiments, be a part of the smart content manager. Alternatively, such merge operations can take place at the database.

In accordance with an embodiment, the smart content manager's request to merge the files can additionally comprise information about how the files are to be merged. Such information can include, but is not limited to, a file type for the output file, an order in which the files are to appear in the merged file, and a metadata tag to be associated with the merged file.

In accordance with an embodiment, the merged file 430 can be returned to the smart content manager 402.

In accordance with an embodiment, the smart content manager can then request that the merged file be stored 435 at the database 403.

Organizing Correlated Content Items into Folios in ECM

In accordance with an embodiment, in some circumstances, it may be desired to organize correlated and/or dependent content items under a single umbrella within the ECM application. However, at the same time, it might not be relevant to merge these content items into one single content item in an ECM application. In such situations, as well as others, folios (also referred to herein as "virtual structures" or "content folios") can be used.

In accordance with an embodiment, virtual structures (folios or content folios) can provide a quick and effective way to assemble, track, and access logical groupings of multiple content items within a content management system. For example, all items relevant to an upcoming brochure, such as images, logos, legal disclosures, and ad copy, can be assembled and sent through a workflow process. Once approved, all associated content can be downloaded and sent for print.

In accordance with an embodiment, as another example, virtual structures can be used when a new project requires a virtual place to assemble all relevant content items in a particular hierarchy, whenever they are checked in, with restricted access to particular areas of the hierarchy. Or a video may need to be associated and tracked with release waivers and narration text. All this can be done with content folios.

In accordance with an embodiment, a content folio or a virtual structure can comprise a file (e.g., a XML (extensible markup language) file) checked into a repository that uses elements to define a hierarchical structure of nodes, slots, and specified content items in the ECM. In practice, a content folio is a logical grouping, or a framework, in which content stored in the repository can be structured. Such folios or virtual structures can vary in complexity as well. Simple folios can comprise a flat container, while advanced folios can nest content in a hierarchy within folders. In an advanced folio, the hierarchy may be established prior to assembling content items, or it may be created during or subsequent to assembling the items.

In accordance with an embodiment, existing folios or virtual structures can have content added to them, or can be locked so that no changes can be made. Content items can be added to a simple folio by searching an associated repository, and to an advanced folio by checking new items into the repository or by searching for content that has previously been checked in, all through an interface. An advanced folio can additionally contain links to outside resources such as websites or shared network drives.

In accordance with an embodiment, for example, consider the above use-case, wherein a medical report of a patient needs to be maintained by a hospital. In such a situation, the patient would be visiting multiple laboratories to get different kinds of medical examinations done like, such as dental x-rays, ECG, MRI, CT scans, etc. In such situations, it may not be relevant for user, such as a dentist, to refer reports like ECG or the MRI for treating a dental condition. Similarly, sometimes certain lab reports can be very confidential, and should not be merged with other reports into one single content item. In such situations, all the correlated reports can still be placed under a single folio, where access to certain portions of the folio, such as confidential lab results, can be controlled via security access rights in ECM application.

In accordance with an embodiment, the systems and methods disclosed herein can allow for the identification of content items (e.g., laboratory reports) being newly uploaded to the ECM application belonging to particular subject (e.g., patient) and organize such content items (multiple laboratory reports) into a virtual structure within the ECM application, which can be referred to as a folio. Such folios can additionally be updated, for example, if a lab report is updated with a new analysis, the lab report in the folio can be likewise updated within the folio.

In accordance with an embodiment, for example, suppose a user that is a surgeon, has to search for a particular folio rather than individual content items (laboratory reports) and download all or some selected content items (laboratory reports) for reference, thus making the job of finding the content item (which is a collection of all the related information on a subject) very easy and in a shorter amount of time.

Figure 5:
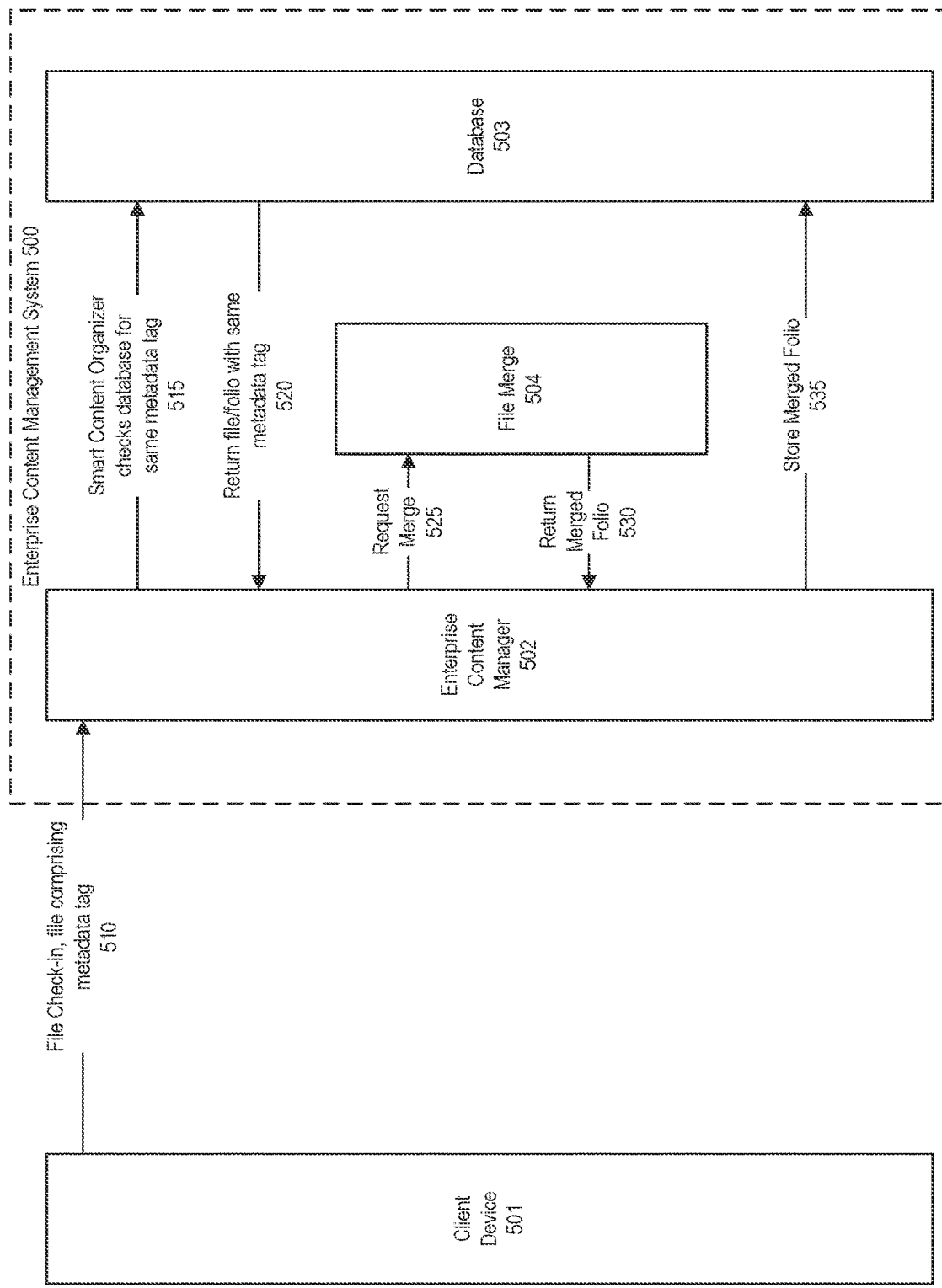
FIG. 5 shows a system for content organization by tracking and learning from user actions, in accordance with an embodiment.

FIG. 5 is a flow chart of a method for file check in and merging in a merged file, in accordance with an embodiment.

In accordance with an embodiment, a request to check in a file 510 can be received from a client device 501 at an enterprise content management system 500. The file can be associated with a metadata tag.

In accordance with an embodiment, a smart content manager 502 can receive the file to be checked in, analyze the metadata tag associated with the checked-in file, and perform a search 515 in a database 503 to check for existing content items that match all, or at least a portion of the metadata tag of the checked in file. Such items can comprise existing files or existing folios.

In accordance with an embodiment, upon finding a file or an existing folio within the database 503 that matches all or at least a portion of the metadata tag, the matching file/folio can be returned 520 to the smart content manager.

In accordance with an embodiment, the smart content manager 502 can request that the checked-in file as well as the file/folio pulled from the database be merged 525, at a file merge 504. The file merge can, in some embodiments, be a part of the smart content manager. Alternatively, such merge operations can take place at the database.

In accordance with an embodiment, the smart content manager's request to merge the files can comprise information about how the files are to be merged. In the use case depicted in FIG. 5, the files are to be merged into a folio by either creating new folio (e.g., in the situation where the returned file from the database was a pre-existing file and not a pre-existing folio), or adding the checked-in content item to an existing folio. In accordance with an embodiment, the folio can assign degrees of security to each content item within a folio separately. For example, such security features of the ECM system can ensure that various content items within folios can only be viewed by privileged users, while other content items within the folio have a lesser degree of security.

In accordance with an embodiment, the folio 530 can be returned to the smart content manager 502.

In accordance with an embodiment, the smart content manager can then request that the folio be stored 535 at the database 503.

Merge Operation for Legacy/Pre-Existing Content Items in ECM

In accordance with an embodiment, in a legacy ECM application (i.e., an ECM application that already contains a number of content items), there can be already large number of content items that are related to a particular subject but scattered throughout the ECM system. The systems and methods presented herein can additionally provide a mechanism of finding such related content items and performing a merge of all the related content items of a particular subject into a merged content item.

In accordance with an embodiment, such existing content items can be merged based upon an identification of the related content items based on metadata tagging. As well, during the merge, controlling capabilities can be provided, like which content item should be appearing in the first page, which content item should be appearing in the last page, and also providing specific page numbers for content items to appear in the final merged single content item.

In accordance with an embodiment, for example, such merge operations on legacy ECM applications can be thought of as a contact list on a smart phone. In such a situation, suggestions can be provided (or automatically performed) to merge contacts with same name (and/or e-mail IDs), but with different phone numbers and stored as separate individual contact items.

In accordance with an embodiment, the systems and methods can also provide an option to choose merging and/or organizing the correlated content items into virtual structure within the ECM application. The merge-agent can scan the legacy ECM application to find all the correlated and/or dependent content items and provide an option to organize such content items into folios.

Figure 6:
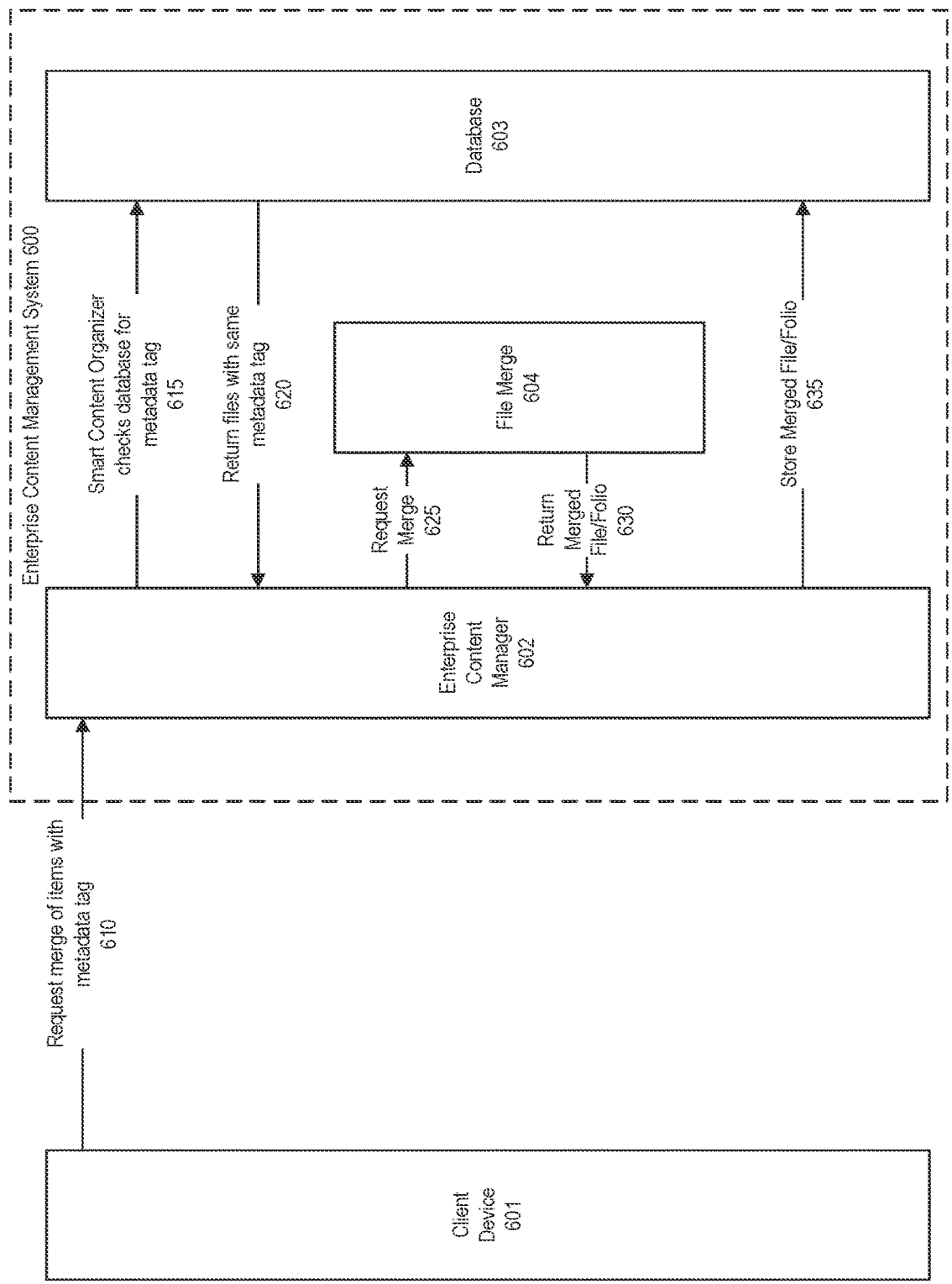
FIG. 6 shows a system for content organization by tracking and learning from user actions, in accordance with an embodiment.

FIG. 6 is a flow chart of a method for file merge in existing database structures, in accordance with an embodiment.

In accordance with an embodiment, a request to merge files 610 in an existing database 603 can be received can be received from a client device 601 at an enterprise content management system 600. The request can be associated with a metadata tag.

In accordance with an embodiment, a smart content manager 602 can receive the request merge existing files, analyze the metadata tag associated with the request, and perform a search 615 in a database 603 to check for existing content items that match all, or at least a portion of the metadata tag of the request. Such items can comprise existing files or existing folios.

In accordance with an embodiment, upon finding files or existing folios within the database 603 that matches all or at least a portion of the metadata tag, the matching files/folios can be returned 620 to the smart content manager.

In accordance with an embodiment, the smart content manager 602 can request that the located files/folios pulled from the database be merged 625, at a file merge 604. The file merge can, in some embodiments, be a part of the smart content manager. Alternatively, such merge operations can take place at the database.

In accordance with an embodiment, the smart content manager's request to merge the files can comprise information about how the files are to be merged. These are described above in the context of FIGS. 4 and 5. More particularly, the merge request 625 can specify that the located files/folios either be merged in an appended file, or merged into a new or existing folio.

In accordance with an embodiment, the merged file or folio 630 can be returned to the smart content manager 602.

In accordance with an embodiment, the smart content manager can then request that the merged file or folio be stored 635 at the database 603.

Use Case Examples

In accordance with an embodiment, the following use case example is provided for illustrative purposes. In a situation where a patient gets blood-test done at an Apollo Clinic and the test report is uploaded into a content management system. After six months, the patient gets the blood-test done again from an Apollo Clinic. When this subsequent test report is uploaded into the content management system, the system can pop-up the already uploaded report along with this new report side-by-side and provides options like "merge into single doc", "organize into folios", "keep items separately".

In accordance with an embodiment, the content management system can provided such options based upon a determined correlation between the related content items. The system can make such determination in a number of different ways. In an embodiment, when a content item is uploaded into the content management system, based on certain pre-configured metadata rules, the content management system can generate smart tag to group content items into different buckets. In the case above, the Apollo Clinic could have assigned every patient a unique ID which could then be used to identify the patient's profile with ease. The content management system could consider metadata fields like, "Patient ID", "Patient Name" and "Type of test" to generate a smart metadata tag and assign the test results the content item being uploaded. Then, when a new lab report is being uploaded, the same metadata fields can be considered for generating the smart metadata tag and pick the already existing content items from that particular bucket and present them side-by-side for ease of comparison and take necessary action.

In accordance with an embodiment, the following use case example is provided for illustrative purposes. In a situation where a bank sends a soft copy of monthly credit card statements to its customers. The content management system with smart content merging feature can allow the bank to present new credit card statements side-by-side with previous credit card statements. This can be done automatically, for example, when a latest credit card statement is uploaded into the ECM application. Here, metadata fields like "card number", "bank name" and "customer name" can be considered for generating the smart metadata tag to group content items into different buckets.

In accordance with an embodiment, the following use case example is provided for illustrative purposes. In a situation where a mobile network provider sends a soft copy of monthly invoice statements to its customers. The ECM system with smart content merging feature can be capable of presenting the invoice statements side-by-side for prior months when a user tries to upload latest invoice into a CMS (content management system) or a ECM. Again, metadata fields like "mobile number", "network provider name" and "customer name" can be considered for generating the smart metadata tag to group content items into different buckets.

Smart Metadata Tag Assignment

In accordance with an embodiment, metadata fields considered for smart tag generation can be configured automatically or by an administrator during the creation of folders or folios. Once the metadata fields are defined, the ECM system can generate smart tags based on the values populated for those metadata fields and assign these tags to each content item during upload/check-in into the ECM system, or during a scan of a legacy system.

In accordance with an embodiment, alternatively, instead of ECM system generating the tags, such tags can be assigned that can be considered for organizing into buckets during the upload/check-in of content items into the ECM system.

In accordance with an embodiment, as well, smart tags can be generated by analyzing the data in the uploaded documents/content items. ECM systems can perform full-text search and comprise content extraction mechanisms for extracting the data. By performing such text searches and data extraction, such data extracted can be used to analyze and determine the type of content item by, for example, processing the number of occurrences of a particular word, phrase, highlighted text, headings, taxonomy, etc. Then, smart tags can be generated by the ECM system by considering a number of possible combinations of such extracted data and assigning these tags to each content items during upload/check-in into the ECM system (or during a scan of a legacy ECM system).

In accordance with an embodiment, in general, as the number of metadata fields (or number of possible combinations) considered for smart tag generation increases, the better the tagging system can perform. For example, an ECM system can have content items/invoices related to multiple users. Assuming only the "mobile number" is considered for smart tagging of invoice bills: when a user ports his/her number from one network provider to another, the comparison of invoices of two different network provider might not provide relevant monthly usage data, since the usage would be dependent on offers and plan chosen. When a customer surrender's the "mobile number" and the same number is assigned to a different customer, the invoices of multiple customers might be pulled up for comparison and/or merge, which is again irrelevant and also a security breach. As such, the tagging system would perform better if more than just "mobile number" tag was used. For example, additional tags such as name, address could additionally be used to provide for a better degree of certainty.

In accordance with an embodiment, as another example, e-mail client applications can be capable of finding relevant documents and can display the previous and latest items side-by-side. In such situations, the convenience and ease at which users would be able to compare documents sent to e-mail accounts would be multi-fold with the implementation of the disclosed features.

In accordance with an embodiment, for example, consider, as soon as a credit card statement is sent to a customer's e-mail account, and when the customer opens that particular e-mail, the e-mail client application, via an ECM system, can pull up the previous 2 months credit card statements and place them side-by-side with the latest statement. This would then allow a user to analyze and compare the documents. The amount of time, resources and manual work saved from end-user perspective is directly proportional to the amount of time spent in finding old e-mails, downloading them on to the local machine and also downloading the latest statement on to the local machine and then opening up all the 3 credit card statements for comparison.

In accordance with an embodiment, an enterprise content management system can be provided. The enterprise content management can support operations such as Check-In, Checkout and Search of content item(s). These operations can be further extended to support smart content merging feature.

In accordance with an embodiment, the enterprise content management system's metadata set can be enhance. Custom metadata tagging can be provided to create grouping to identify the content items to relate and represent multiple content items as a single content item. The number of custom metadata set/tagging can be determined depending upon the digital eco-system.

In accordance with an embodiment, an auto-merge content agent can be provided and triggered during upload of content items into the enterprise content management system. This agent can be responsible to run deep scan on the smart metadata tagging to quickly identify the related content items corresponding to the item being uploaded to the enterprise content management system. Upon successfully identifying related content items, a user can optionally be provided with options to choose if the new content item should be appended to end, should be made the first page or should be inserted at any particular page number. Such decision can also be made automatically based upon a rules set. The auto-merge agent can run the merging mechanism within enterprise content management system to produce a final content item.

In accordance with an embodiment, the auto-merge content agent can be triggered based on already existing content items within the enterprise content management system to identify all the related content items depending upon the smart metadata tagging. Again upon successfully identifying the co-related content item, a user can optionally be provided with options to choose if the content items selected for merge meets User criteria and correspondingly User can choose which content item needs to be appended to end, should be made the first page or should be inserted at any particular page number. Such decision can also be made automatically based upon a rules set. The auto-merge agent can run the merging mechanism within enterprise content management system to produce a final content item.

Figure 7:
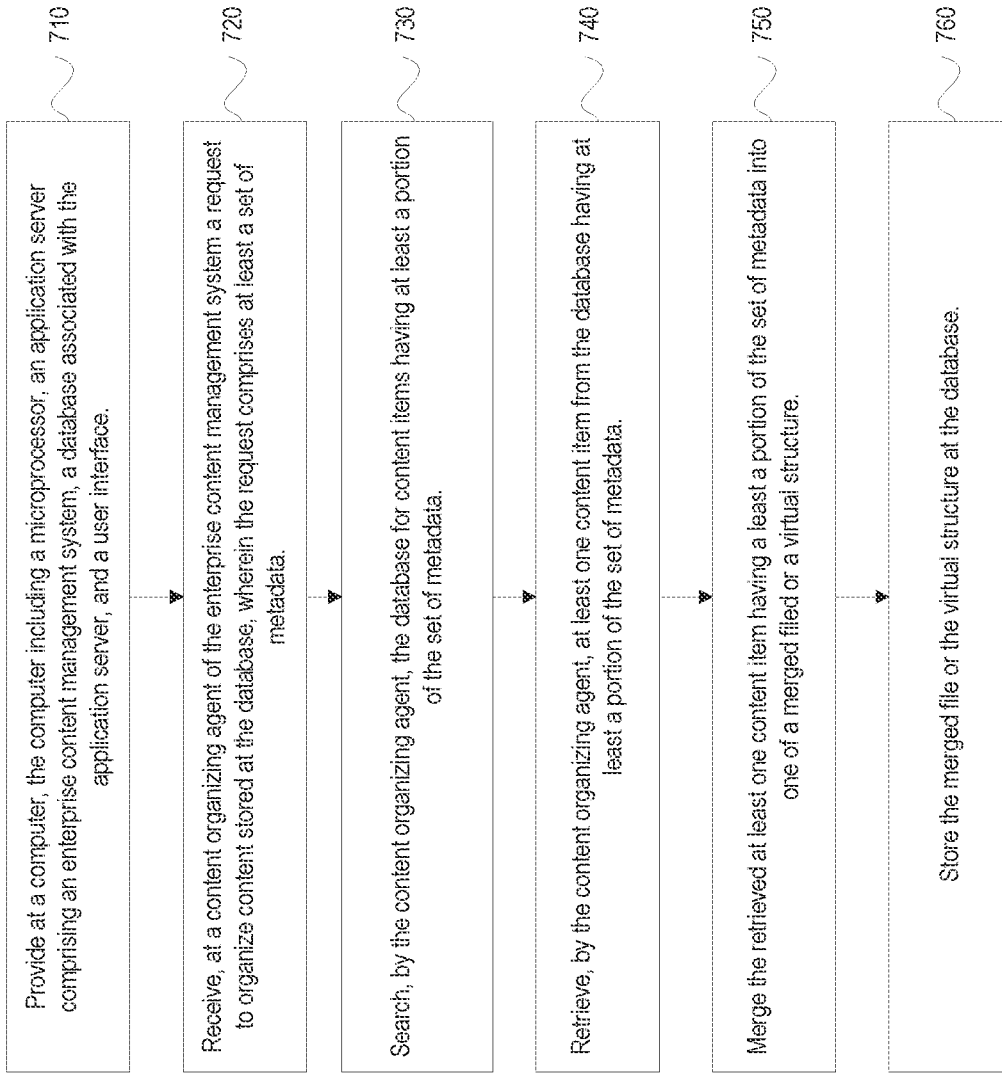
FIG. 7 is a flowchart of a method for providing a correlated content organizing technique in a content management system, in accordance with an embodiment.

FIG. 7 is a flowchart of a method for providing a correlated content organizing technique in a content management system, in accordance with an embodiment.

At step 710, in accordance with an embodiment, the method can provide at a computer, the computer including a microprocessor, an application server comprising an enterprise content management system, a database associated with the application server, and a user interface.

At step 720, in accordance with an embodiment, the method can receive, at a content organizing agent of the enterprise content management system a request to organize content stored at the database, wherein the request comprises at least a set of metadata.

At step 730, in accordance with an embodiment, the method can search, by the content organizing agent, the database for content items having at least a portion of the set of metadata.

At step 740, in accordance with an embodiment, the method can retrieve, by the content organizing agent, at least one content item from the database having at least a portion of the set of metadata.

At step 750, in accordance with an embodiment, the method can merge the retrieved at least one content item having a least a portion of the set of metadata into one of a merged filed or a virtual structure.

At step 760, in accordance with an embodiment, the method can store the merged file or the virtual structure at the database.

Correlated Content Organization Based on Training Set

In accordance with an embodiment, the systems and methods described herein build upon the above and provides a nibble approach. In addition to using configuration to drive content merge, the described systems and methods can additionally utilize received inputs to build a training set to be used with a suggestion engine to provide indications of documents or other content to be merged. Based upon received inputs in response to suggested merges, the systems and methods can further build the training set and refine future suggestions to merge content, whether the content is new content uploaded from a client device, or existing content in, for example, a content management system.

In accordance with an embodiment, the systems and methods described herein can build a training set based upon observations of received inputs to determine patterns that are used often in content merges. Once a pattern is established, the systems and methods can provide indications of proposed merges based upon the training set and rules established therefrom that fit the same, or similar (e.g., within a defined variant) of the pattern. The system can then receive an indication of whether the suggestion is accepted or rejected, and such decision can be fed back into the learning system. This way the accuracy of the content merge improves over time.

In accordance with an embodiment, an exemplary system for providing correlated content organization in a content management is derived from the usual work of content managers/authors/administrators as they merge documents. Such monitoring of work of content manager/authors/administrators can result in the creation, refinement, or updating of a training set. The system can monitor the behavior of users as they perform document merges and compute correlations between document metadata properties.

In accordance with an embodiment, a method can provide, at a content management system, a file merge suggestion engine, the file merge suggestion engine being associated with a storage comprising a training set, which itself comes out the system as described above. The method can configure, by the file merge suggestion engine, a merge suggestion rule, the configuring being based upon a plurality of prior file merges recorded in the training set. The method can receive, at the content management system, a file, the file having a set of metadata values. The method can provide a suggestion to merge the received file with one or more existing files at the database, the suggestion being based upon the configured merge suggestion rule. The method can receive, at the content management system, a response to the suggestion to merge the received file with one or more existing files at the database. The method can update a confidence score associated with the merge suggestion rule based upon the received response.

In accordance with an embodiment, upon the receipt of the suggestion, the system can receive a response indicative of, for example, an acceptance of the suggestion or a rejection of the suggestion. Accepted suggestions result in the merge of additional documents and rejected suggestions are discarded. However both accepted and rejected suggestions, along with the document metadata properties that resulted in the suggestions, subsequently amends the training set as described above. In effect, accepting a suggestion is treated the same as user creating a training set (as in 009), aided by the suggestion engine.

Figure 8:
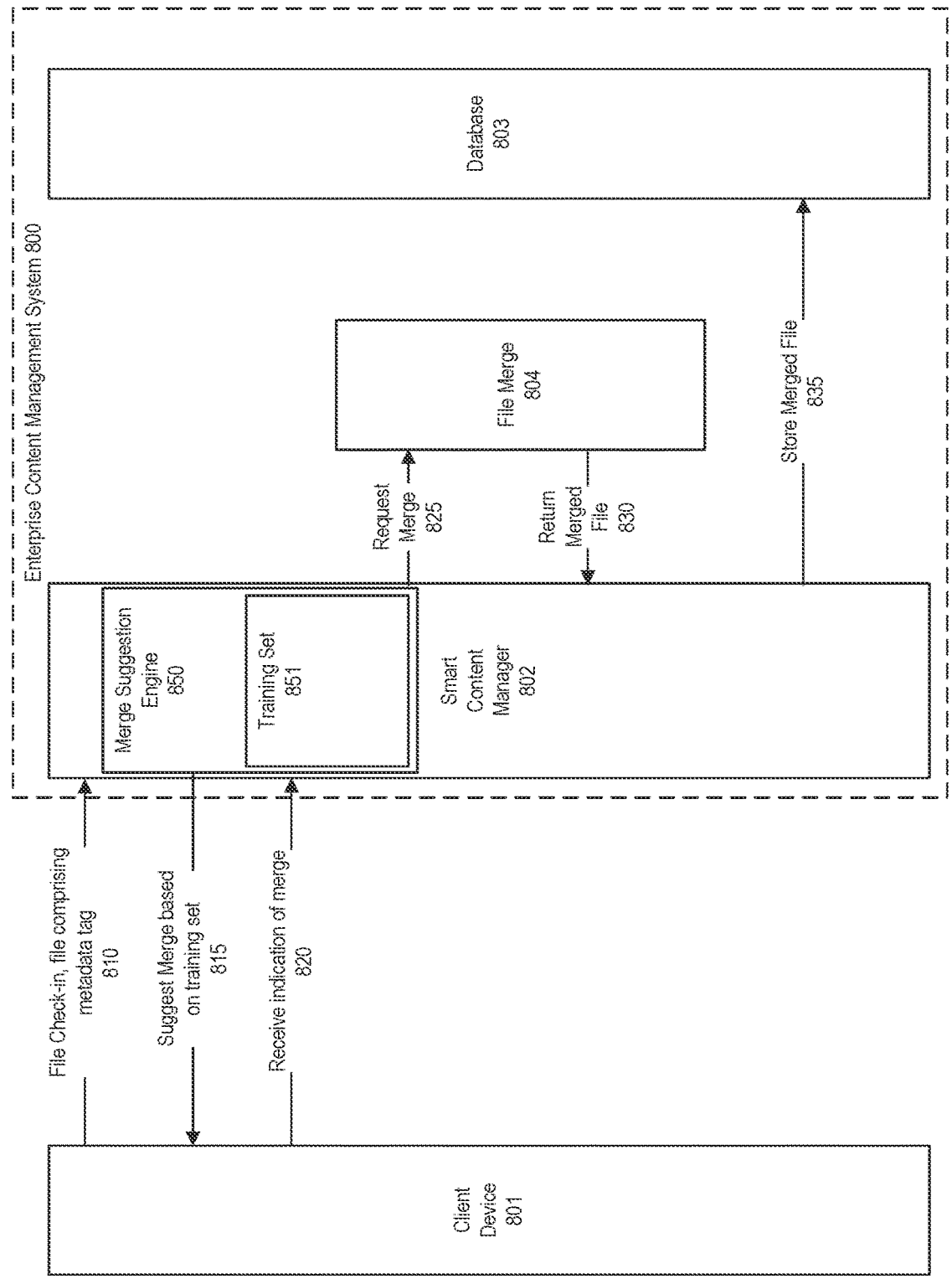
FIG. 8 shows a system for correlated content organization based upon a training set, in accordance with an embodiment.

FIG. 8 shows a system for correlated content organization based upon a training set, in accordance with an embodiment.

In accordance with an embodiment, a request to check in a file 810 can be received from a client device 801 at an enterprise content management system 800. The file can be associated with a metadata tag having a plurality of distinct metadata properties, at least which a set of plurality of metadata properties have values.

In accordance with an embodiment, a smart content manager 802 can receive the file to be checked in, analyze the metadata properties associated with the checked-in file, via a merge suggestion engine 850, provide a suggestion 815 to merge the check-in file with one or more existing files or folio at the database 803.

In accordance with an embodiment, the suggestion to merge the file 815 can be generated by the merge suggestion engine based upon one or more rules developed by the merge suggestion engine based upon a training set 851 that is associated with the merge suggestion engine. The rules can, for example, provide that a suggestion can be based upon a number of the plurality of metadata properties matching with existing files in the database, or based upon specific set of the plurality of metadata properties matching with existing files in the database.

In accordance with an embodiment, while the training set is shown as being part of the merge suggestion engine within the figure, one of skill in the art would readily understand that the training set can be external to the content management system while remaining accessible by the merge suggestion engine.

In accordance with an embodiment, the smart content manager can, in response to providing the suggestion, receive an indication 820 that the suggestion should be followed and that the files (or folios) should be merged.

In accordance with an embodiment, this indication that the suggestion was accepted can be fed into the training set such that subsequent suggestions for file merges are based upon an updated or improved rule and training set.

In accordance with an embodiment, after receiving the indication that the suggestion to merge the files (or folios) was accepted, the smart content manager 802 can request that the checked-in file as well as the file (or folio) from the database be merged 825, at a file merge 804. The file merge can, in some embodiments, be a part of the smart content manager. Alternatively, such merge operations can take place at the database.

In accordance with an embodiment, the smart content manager's request to merge the files can additionally comprise information about how the files are to be merged. Such information can include, but is not limited to, a file type for the output file, an order in which the files are to appear in the merged file, and a metadata tag to be associated with the merged file, or a placement of the newly checked in file in a folio.

In accordance with an embodiment, the merged file 830 can be returned to the smart content manager 802.

In accordance with an embodiment, the smart content manager can then request that the merged file be stored 835 at the database 803.

Figure 9:
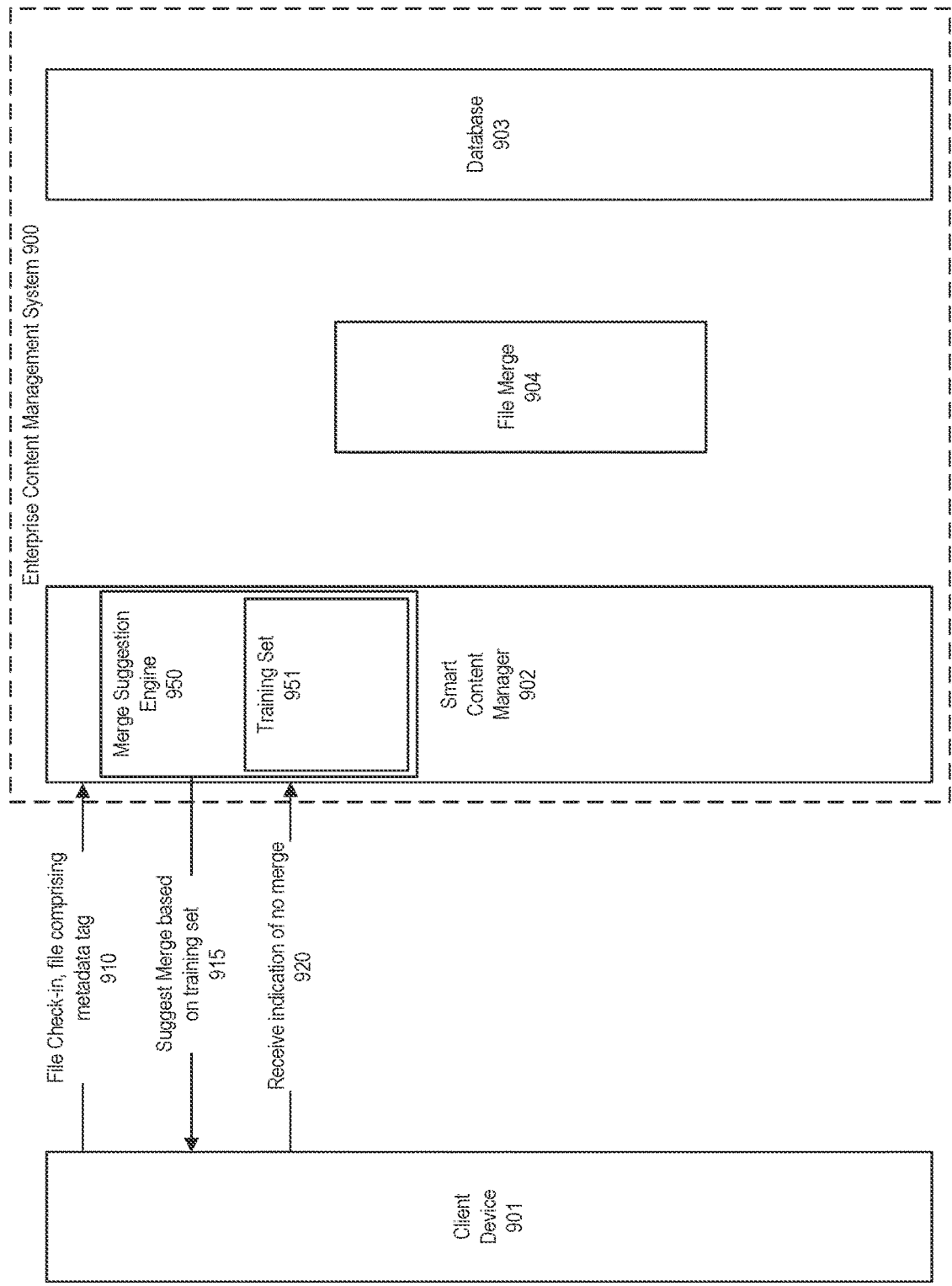
FIG. 9 shows a system for correlated content organization based upon a training set, in accordance with an embodiment.

FIG. 9 shows a system for correlated content organization based upon a training set, in accordance with an embodiment.

In accordance with an embodiment, a request to check in a file 910 can be received from a client device 901 at an enterprise content management system 900. The file can be associated with a metadata tag having a plurality of distinct metadata properties, at least which a set of plurality of metadata properties have values.

In accordance with an embodiment, a smart content manager 902 can receive the file to be checked in, analyze the metadata properties associated with the checked-in file, via a merge suggestion engine 950, provide a suggestion 915 to merge the check-in file with one or more existing files or folio at the database 903.

In accordance with an embodiment, the suggestion to merge the file 915 can be generated by the merge suggestion engine based upon one or more rules developed by the merge suggestion engine based upon a training set 951 that is associated with the merge suggestion engine. The rules can, for example, provide that a suggestion can be based upon a number of the plurality of metadata properties matching with existing files in the database, or based upon specific set of the plurality of metadata properties matching with existing files in the database.

In accordance with an embodiment, while the training set is shown as being part of the merge suggestion engine within the figure, one of skill in the art would readily understand that the training set can be external to the content management system while remaining accessible by the merge suggestion engine.

In accordance with an embodiment, the smart content manager can, in response to providing the suggestion, receive an indication 920 that the suggestion should not be followed and that the files (or folios) should not be merged.

In accordance with an embodiment, this indication that the suggestion was not accepted can be fed into the training set such that subsequent suggestions for file merges are based upon an updated or improved rule and training set.

Figure 10:
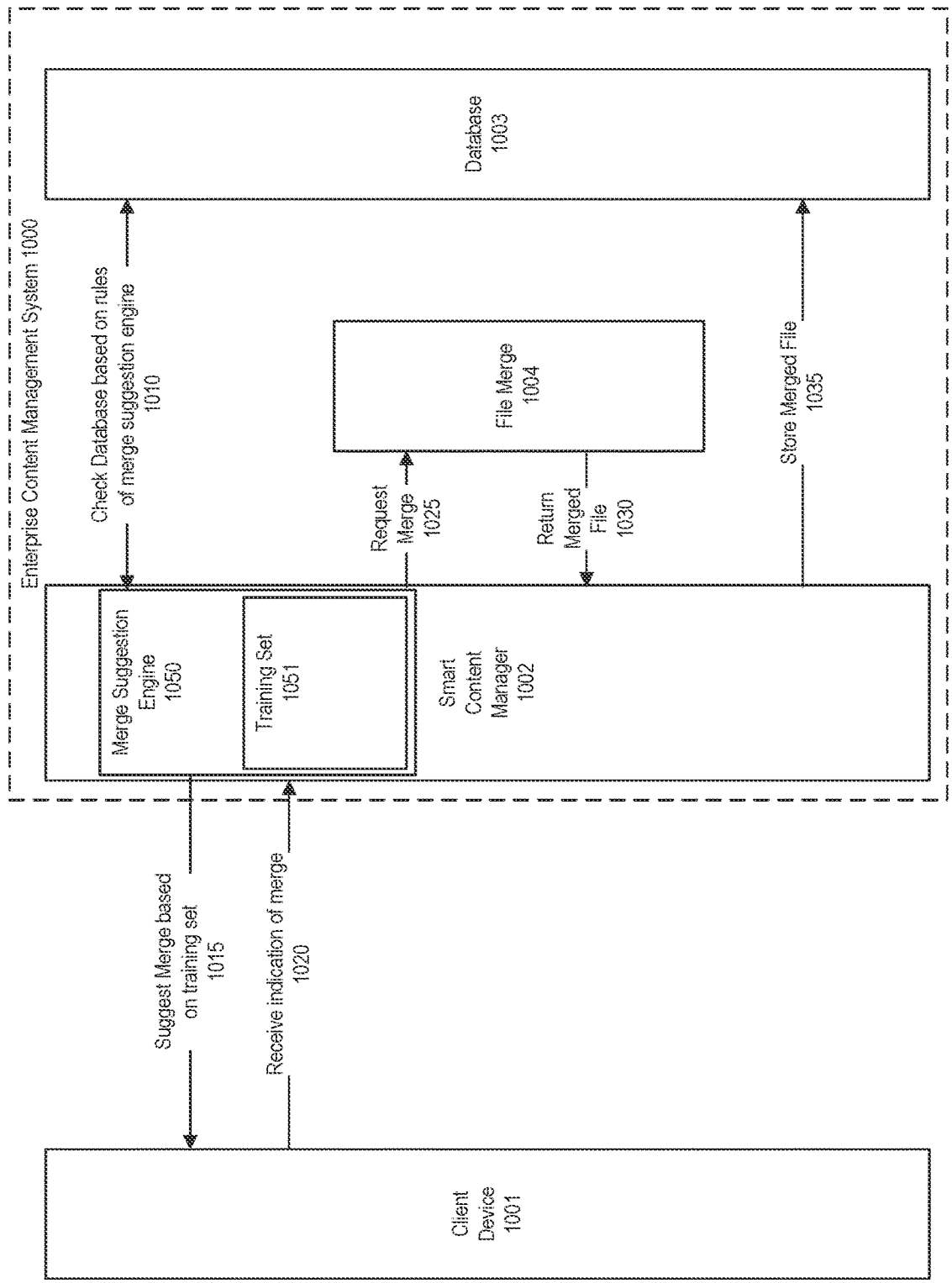
FIG. 10 shows a system for correlated content organization based upon a training set, in accordance with an embodiment.

FIG. 10 shows a system for correlated content organization based upon a training set, in accordance with an embodiment.

In accordance with an embodiment, within a content management system 1000, a smart content manager 1002 can perform a check 1010 within a database 1003, the check being based upon one or more rules of the merge suggestion engine 1050, based upon the training set 1051, to determine two or more files (e.g., distinct content items, previously merged documents, folios . . . etc.) that can be provided in a suggestion to merge 1015 to a client device 1001. Each of the two or more files can be associated with a metadata tag having a plurality of distinct metadata properties, at least which a set of plurality of metadata properties have values.

In accordance with an embodiment, based upon the check, a suggestion 1015 can be provided to a client device to merge the files within the database 1003.

In accordance with an embodiment, the suggestion to merge the file 1015 can be generated by the merge suggestion engine based upon one or more rules developed by the merge suggestion engine based upon a training set 1051 that is associated with the merge suggestion engine. The rules can, for example, provide that a suggestion can be based upon a number of the plurality of metadata properties matching with existing files in the database, or based upon specific set of the plurality of metadata properties matching with existing files in the database.

In accordance with an embodiment, while the training set is shown as being part of the merge suggestion engine within the figure, one of skill in the art would readily understand that the training set can be external to the content management system while remaining accessible by the merge suggestion engine.

In accordance with an embodiment, the smart content manager can, in response to providing the suggestion, receive an indication 1020 that the suggestion should be followed and that the files (or folios) should be merged.

In accordance with an embodiment, this indication that the suggestion was accepted can be fed into the training set such that subsequent suggestions for file merges are based upon an updated or improved rule and training set.

In accordance with an embodiment, after receiving the indication that the suggestion to merge the files (or folios) was accepted, the smart content manager 1002 can request that the files from the database be merged 1025, at a file merge 1004. The file merge can, in some embodiments, be a part of the smart content manager. Alternatively, such merge operations can take place at the database.

In accordance with an embodiment, the smart content manager's request to merge the files can additionally comprise information about how the files are to be merged. Such information can include, but is not limited to, a file type for the output file, an order in which the files are to appear in the merged file, and a metadata tag to be associated with the merged file, or a placement of the newly checked in file in a folio.

In accordance with an embodiment, the merged file 1030 can be returned to the smart content manager 1002.

In accordance with an embodiment, the smart content manager can then request that the merged file be stored 1035 at the database 1003.

Figure 11:
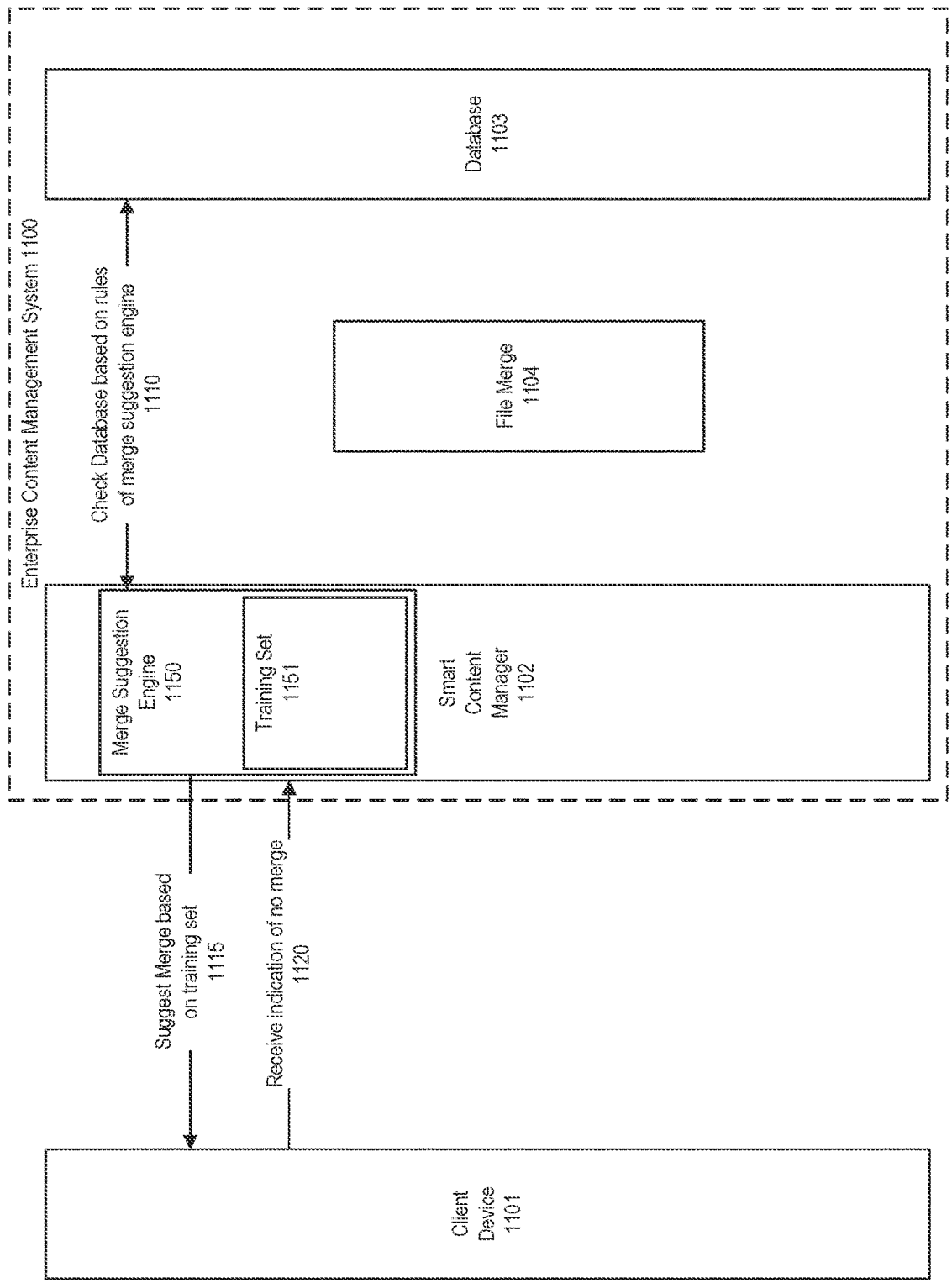
FIG. 11 shows a system for correlated content organization based upon a training set, in accordance with an embodiment.

FIG. 11 shows a system for correlated content organization based upon a training set, in accordance with an embodiment.

In accordance with an embodiment, within a content management system 1100, a smart content manager 1102 can perform a check 1110 within a database 1103, the check being based upon one or more rules of the merge suggestion engine 1150, based upon the training set 1151, to determine two or more files (e.g., distinct content items, previously merged documents, folios . . . etc.) that can be provided in a suggestion to merge 1115 to a client device 1101. Each of the two or more files can be associated with a metadata tag having a plurality of distinct metadata properties, at least which a set of plurality of metadata properties have values.

In accordance with an embodiment, based upon the check, a suggestion 1115 can be provided to a client device to merge the files within the database 1103.

In accordance with an embodiment, the suggestion to merge the file 1115 can be generated by the merge suggestion engine based upon one or more rules developed by the merge suggestion engine based upon a training set 1151 that is associated with the merge suggestion engine. The rules can, for example, provide that a suggestion can be based upon a number of the plurality of metadata properties matching with existing files in the database, or based upon specific set of the plurality of metadata properties matching with existing files in the database.

In accordance with an embodiment, while the training set is shown as being part of the merge suggestion engine within the figure, one of skill in the art would readily understand that the training set can be external to the content management system while remaining accessible by the merge suggestion engine.

In accordance with an embodiment, the smart content manager can, in response to providing the suggestion, receive an indication 1120 that the suggestion should not be followed and that the files (or folios) should not be merged.

In accordance with an embodiment, this indication that the suggestion was not accepted can be fed into the training set such that subsequent suggestions for file merges are based upon an updated or improved rule and training set.

FIG. 12 shows a training set, in accordance with an embodiment.

In accordance with an embodiment, a training set 1200 can comprise a number of documents 1202 (content items, files, folios), each document comprising a number of metadata properties 1201. Shown in the figure are 12 documents with 8 metadata properties. Of note is that each document does not necessarily need to have each defined metadata property present. As an example, Document 1 1210 has values for metadata properties 1 through 5, and property 7, but does not have values for metadata properties 6 and 8.

In accordance with an embodiment, the training set 1200 can be used, for example, to create one or more rules for proposing suggestions to merge files. The term rule is used a generic sense, it is not an explicit rule but represents a class of machine learning techniques to determine corrections as well as classifications. The following use case example is illustrative of such creation of rules, the example is simplified for the purposes of understanding the underlying concept. Various machine learning techniques may be involved in accomplishing various aspects of logic described below. In addition, metadata values described need not be the exact values but value ranges. The following use case example is illustrative of such creation of rules.

In accordance with an embodiment, based upon the training set 1200, a suggestion to merge document 1 1210, document 6 1212, and document 10 1213 can be generated as these three documents have matches of metadata properties 1, 2, and 5. Such a suggestion can be generated by the merge suggestion engine, as described above.

In accordance with an embodiment, such proposal for merging documents 1, 6, and 10 can, in addition to being based upon a matching of a threshold number of metadata properties (such threshold number can be set, or the system can determine the threshold based on statistically significant number of matches as well as be updated as a rule based upon a training set is further modified and updated), can also be based upon contents of the documents.

In accordance with an embodiment, such proposal for merging documents 1, 6, and 10 can, in addition to being based upon a matching of a threshold number of metadata properties (such threshold number can be set, as well as be updated as a rule based upon a training set is further modified and updated), can also be based upon contents of the documents.

In accordance with an embodiment, upon receiving an indication that the suggestion to merge documents 1, 6, and 10 is accepted, a rule can be generated to provide a suggestion to merge documents when such documents match values of metadata properties 1, 2, and 5.

In accordance with an embodiment, after establishing such a rule, the merge suggestion engine can review the remaining documents in the training set to establish whether additional documents should be suggested to be merged based upon matching values in metadata properties 1, 2, and 5.

In accordance with an embodiment, then, documents 2 1214 and 7 1215 can be suggested to be merged by the merge suggestion engine as these documents have the same values in metadata properties 1, 2, and 5, and thus fall within the rule.

In accordance with an embodiment, based upon an acceptance of the suggested merge of documents 2 and 7, the rule utilized by the merge suggestion engine can be updated in at least two ways. First, a confidence score for the rule can be increased based upon the successful suggestion (conversely, if the suggestion had been rejected, a confidence score of the rule could be decreased), and a new metadata property match value could be added to the rule. This is because in addition to matching properties 1, 2, and 5, documents 2 and 8 additionally match values in metadata property 8.

In accordance with an embodiment, then, metadata property 8 can be added to the rule, while still maintaining a threshold value of matching at least 3 metadata properties prior to suggestion a merge of two or more documents.

In accordance with an embodiment, then, document 3 1216 and document 8 1217 can be suggested to be merged by the merge suggestion engine. While these documents only share the same metadata value for the original metadata properties of the rule (namely properties 1 and 2), and differ in values for metadata property 5, the two documents share values for metadata property 8. Because of this, documents 3 and 8 share at least the threshold number of metadata values to be suggested to be merged by the rule, and thus a suggestion to merge can be provided.

In accordance with an embodiment, based upon an acceptance of the suggested merge of documents 3 and 8, the rule utilized by the merge suggestion engine can be updated. As an example, a confidence score for the rule (the updated rule providing that at least 3 of four metadata properties, namely property 1, 2, 5, and 8, must match in order to be suggested to be merged) can be increased based upon the successful suggestion (conversely, if the suggestion had been rejected, a confidence score of the rule could be decreased).

In accordance with an embodiment, in addition to performing the above described metadata matching analysis, the merge suggestion engine can additionally perform an analysis to determine whether the documents 1202 belong to a class of documents that are merged. A linear classifier (e.g., logistic regression or a naive Bayes classifier) can be used to establish whether the documents are of a type to be merged.

In accordance with an embodiment, as an example, the merge suggestion engine can, based upon prior successful merges of documents, as well as prior decisions not to merge documents, determine that a document of type A is relatively unlikely to be merged (e.g., a resume), while a document of type B are relatively likely to be merged (e.g., an invoice). Such analysis can be performed on a linear scale approach to approximate a binary decision.

In accordance with an embodiment, in addition to providing suggestions for merges of documents, document merge engines having rules with a sufficiently high confidence score can be set to automatically merge documents based on, for example, a probability of successful merge (e.g., 95% or 98%).

In accordance with an embodiment, in addition to providing suggestions for merges of documents, document merge engines having rules with a sufficiently high confidence score can be set to automatically merge documents based on, for example, a probability of successful merge (e.g., 95% or 98%) based upon a "streak" of successful merge suggestions. Such a "streak" suggestion can be indicative of a high probability that two or more documents matched via a rule of a document merge engine would be merged if provided as a suggestion.

In accordance with an embodiment, a current streak, or information indicative of a current streak of successfully suggested merges can result in an increase in a confidence score due to the detection of such a streak. In determining and/or update confidence, a method can rely on a "success streak" score. Such a success streak score can be indicative of an amount of recent similar merge suggestions that have been accepted. By similar merge suggestions, this can mean the suggestions that used similar correlations to arrive at the suggestion. In other words, such a success streak can take advantage of the fact that common set of operations happen often together in organizations. Suppose for example a new regulation requires that certain types of receipts be merged into the invoices. In a large data set and training set, it may take many trials for the system to recognize the pattern. However with the streak factor added to the confidence, more recent successful merges and assumptions that lead to them, gain an upper hand algorithmically.

Figure 13:
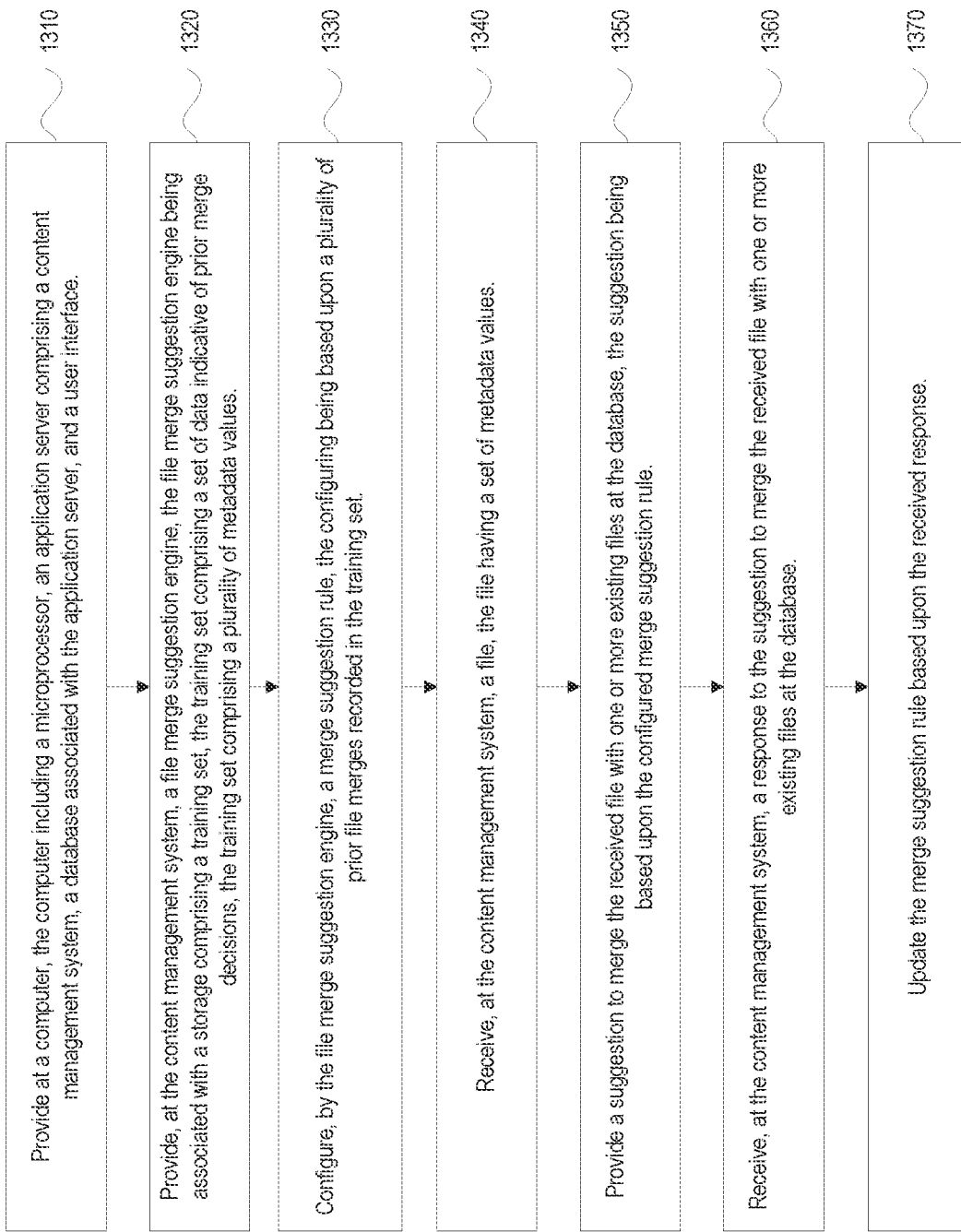
FIG. 13 is a flowchart of a method for providing correlated content organization in a content management system based on a training set, in accordance with an embodiment.

FIG. 13 is a flowchart of a method for providing correlated content organization in a content management system based on a training set, in accordance with an embodiment.

In accordance with an embodiment, at step 1310, the method can provide at a computer, the computer including a microprocessor, an application server comprising a content management system, a database associated with the application server, and a user interface.

In accordance with an embodiment, at step 1320, the method can provide, at the content management system, a file merge suggestion engine, the file merge suggestion engine being associated with a storage comprising a training set, the training set comprising a set of data indicative of prior merge decisions, the training set comprising a plurality of metadata values.

In accordance with an embodiment, at step 1330, the method can configure, by the file merge suggestion engine, a merge suggestion rule, the configuring being based upon a plurality of prior file merges recorded in the training set.

In accordance with an embodiment, at step 1340, the method can receive, at the content management system, a file, the file having a set of metadata values.

In accordance with an embodiment, at step 1350, the method can provide a suggestion to merge the received file with one or more existing files at the database, the suggestion being based upon the configured merge suggestion rule.

In accordance with an embodiment, at step 1360, the method can receive, at the content management system, a response to the suggestion to merge the received file with one or more existing files at the database.

In accordance with an embodiment, at step 1370, the method can update a confidence score associated with the merge suggestion rule based upon the received response.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, mini-computers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application program code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A method for managing correlated content in a content management system, comprising:
   providing, at a computer including a microprocessor,
      an application server comprising an enterprise content management system, and
      a database associated with the application server;
   receiving a request to merge a received content with content stored at the database, wherein the request comprises a metadata associated with the received content;
   generating a merge suggestion rule for the received content based upon the metadata associated with the received content and a plurality of prior content merges;
   generating one or more suggested merges for the received content with the content stored at the database, based upon the generated merge suggestion rule;
   merging the retrieved content according to a suggested merge, and updating a confidence score associated with the generated merge suggestion rule; and
   storing the retrieved content as merged with the content stored at the database.

2. The method of claim 1, wherein the generated merge suggestion rule comprises a comparison to determine whether a selected set of metadata values of the received content matches one or more existing content at the database.

3. The method of claim 2, wherein a received response indicates to merge a received content with one or more existing content files at the database.

4. The method of claim 3, wherein updating the confidence score associated with the generated merge suggestion rule comprises increasing the confidence score.

5. The method of claim 3, further comprising:
   based upon the received response indicating to merge the received content with the one or more existing content files at the database, updating the generated merge suggestion rule.

6. The method of claim 5, wherein updating the generated merge suggestion rule comprises:
   adding a metadata value to a selected set of the plurality of metadata values.

7. The method of claim 2,
   wherein a received response indicates to not merge the received content with the one or more existing content files at the database; and
   wherein updating the confidence score associated with the generated merge suggestion rule comprises lowering the confidence score.

8. A system for providing correlated content organization in a content management system based on a training set, comprising:
   a computer including a microprocessor;
   an application server comprising a content management system; and
   a database associated with the application server;
   wherein the system operates to:
   receive a request to merge a received content with content stored at the database, wherein the request comprises a metadata associated with the received content;
   generate a merge suggestion rule for the received content based upon the metadata associated with the received content and a plurality of prior content merges;
   generate one or more suggested merges for the received content with the content stored at the database, based upon the generated merge suggestion rule;
   merge the retrieved content according to a suggested merge, and updating a confidence score associated with the generated merge suggestion rule; and
   store the retrieved content as merged with the content stored at the database.

9. The system of claim 8, wherein the generated merge suggestion rule comprises a comparison to determine whether a selected set of metadata values of the received content matches one or more existing content at the database.

10. The system of claim 9, wherein a received response indicates to merge a received content with one or more existing content files at the database.

11. The system of claim 10, wherein updating the confidence score associated with the generated merge suggestion rule comprises increasing the confidence score.

12. The system of claim 10, further comprising:
   based upon the received response indicating to merge the received content with the one or more existing content files at the database, updating the generated merge suggestion rule.

13. The system of claim 12, wherein updating the generated merge suggestion rule comprises:
   adding a metadata value to a selected set of the plurality of metadata values.

14. The system of claim 9,
   wherein a received response indicates to not merge the received content with the one or more existing content files at the database; and
   wherein updating the confidence score associated with the generated merge suggestion rule comprises lowering the confidence score.

15. A non-transitory computer readable storage medium having instructions thereon for providing correlated content organization in a content management system based on a training set, which when read and executed by cause a computer to perform a method comprising:
   providing, at a computer including a microprocessor,
      an application server comprising an enterprise content management system, and
      a database associated with the application server;
   receiving a request to merge a received content with content stored at the database, wherein the request comprises a metadata associated with the received content;
   generating a merge suggestion rule for the received content based upon the metadata associated with the received content and a plurality of prior content merges;
   generating one or more suggested merges for the received content with the content stored at the database, based upon the generated merge suggestion rule;
   merging the retrieved content according to a suggested merge, and updating a confidence score associated with the generated merge suggestion rule; and
   storing the retrieved content as merged with the content stored at the database.

16. The non-transitory computer readable storage medium of claim 15, wherein the generated merge suggestion rule comprises a comparison to determine whether a selected set of metadata values of the received content matches one or more existing content at the database.

17. The non-transitory computer readable storage medium of claim 16, wherein a received response indicates to merge a received content with one or more existing content files at the database.

18. The non-transitory computer readable storage medium of claim 17, wherein updating the confidence score associated with the generated merge suggestion rule comprises increasing the confidence score.

19. The non-transitory computer readable storage medium of claim 17, further comprising:
   based upon the received response indicating to merge the received content with the one or more existing content files at the database, updating the generated merge suggestion rule.

20. The non-transitory computer readable storage medium of claim 17, the method further comprising:
   based upon the received response indicating to merge the received file with the one or more existing files at the database, updating the generated merge suggestion rule;
   wherein updating the generated merge suggestion rule comprises:
      adding a metadata value to the selected set of the plurality of metadata values,
      wherein updating the confidence score associated with the generated merge suggestion rule comprises lowering the confidence score.

* * * * *

UNITED STATES PATENT AND TRADEMARK OFFICE
CERTIFICATE OF CORRECTION

| | |
|---|---|
| PATENT NO. | : 12,001,389 B2 |
| APPLICATION NO. | : 17/741172 |
| DATED | : June 4, 2024 |
| INVENTOR(S) | : Kadlabalu et al. |

It is certified that error appears in the above-identified patent and that said Letters Patent is hereby corrected as shown below:

In the Drawings

On sheet 7 of 13, in FIGURE 7, under Reference Numeral 750, Line 1, delete "a least" and insert -- at least --, therefor.

In the Specification

In Column 14, Line 18, delete "a least" and insert -- at least --, therefor.

Signed and Sealed this
First Day of October, 2024

Katherine Kelly Vidal
*Director of the United States Patent and Trademark Office*